Patented June 8, 1948

2,442,854

UNITED STATES PATENT OFFICE 2,442,854

PROCESS OF PREPARING THE OXIME OF 1-DIETHYL-AMINO-4-PENTANONE

Marlin T. Leffler, Lake Bluff, and James E. Rundell, North Chicago, Ill., assignors to Abbott Laboratories, North Chicago, Ill., a corporation of Illinois No Drawing. Application November 30, 1944, Serial No. 566,032

2 Claims. (Cl. 260—566)

The object of this invention is to afford an improved process for preparing an intermediate used in the synthesis of a medicinal chemical and more specifically an improved method of synthesis of the oxime of 1-diethyl amino-4-pentanone.

This oxime may be reduced to form 1-diethyl amino-4-amino-pentane which when reacted with 2-methoxy 6,9 dichloro-acridine yields quinacrine. Quinacrine (more commonly known under the trade-name of "Atabrine") is at present a popular anti-malarial drug.

In synthesizing the above-mentioned oxime by our improved method, we first prepare the sodium derivative of ethyl acetoacetate from ethyl acetoacetate and sodium methylate, using benzene as a reaction medium. The sodium derivative of ethyl acetoacetate is then reacted with β diethylamino ethyl chloride to form aceto-γ-diethylamino butyric acid ethyl ester which on saponification and decarboxylation yields 1-diethyl amino-4-pentanone. The 1-diethyl amino-4-pentanone may be converted directly to the oxime in the water solution where it is originally formed if proper conditions are maintained as described in the example. After formation of the oxime it may be removed from the aqueous solution by rendering the solution alkaline, extracting with benzene, and removing the benzene by distillation. A good yield of crude oxime is obtained, and this may be reduced to 1-diethyl amino-4-amino pentane either by use of sodium and alcohol, or by catalytic hydrogenation under high pressure. The following reactions will serve to illustrate our invention:

REACTION I

*Preparation of β diethyl-amino-ethyl chloride*

$$(C_2H_5)_2NCH_2CH_2Cl \cdot HCl + NaOH \longrightarrow (C_2H_5)_2NCH_2CH_2Cl + NaCl$$

Add 780 parts of diethyl amino ethyl chloride hydrochloride to a mixture of 400 parts of ice and 400 parts of water, stirring to dissolve. To this, with stirring and cooling, add a cold solution of 230 parts of sodium hydroxide in 250 parts of water, maintaining a temperature of 15° C. or less. Extract the liberated diethyl-amino-ethyl chloride with 600 parts of benzene. Dry the benzene solution with anhydrous sodium sulfate and filter clear.

REACTION II

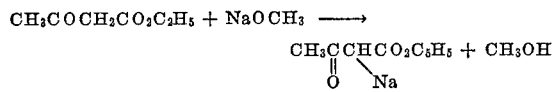

Place 176 parts of solid sodium methylate in a flask equipped for stirring and distillation. Add 3500 parts of dry benzene and heat to 80° C. While stirring, gradually add 416 parts of ethyl acetoacetate and distill by straight distillation until the temperature has reached 80° C. within the flask. This removes alcohol and moisture and some of the benzene.

REACTION III

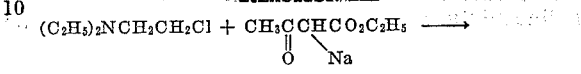
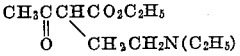

Cool the suspension of sodium derivative of ethyl aceto acetate in benzene (from Reaction II) to 50° C. and with good agitation slowly introduce the benzene solution of diethyl amino ethyl chloride over a two-hour period at that temperature. After the addition is complete, heat at refluxing temperature for four hours. Cool to room temperature and wash the benzene solution free of salt with 1500 parts of water.

REACTION IV

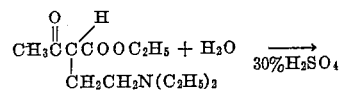
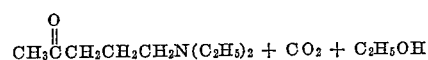

Extract the benzene layer from Reaction III three times with equal portions of a cold solution of 576 parts of chemically pure $H_2SO_4$ in 1350 parts of water. Extract the combined acid washes once with 700 parts of ether to remove ether-soluble impurities. Place the sulfuric acid-water solution in a flask and heat on the steam bath for 12 hours, at the end of which interval evolution of carbon dioxide will have practically ceased.

REACTION V

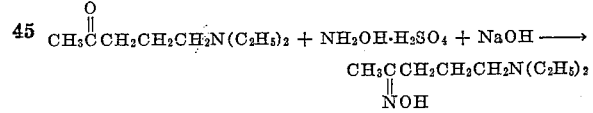

Cool the solution from Reaction IV to 10° C. and, keeping within this temperature range, add slowly a cold solution of 445 parts of sodium hydroxide in 600 parts of water. Follow this with the addition of a solution of 288 parts of hydroxyl ammonium sulfate in 600 parts of water. Stir well and let stand at room temperature for 12 hours. Heat gradually to 50° C. and stir for three hours at this temperature. Cool to 15° C. and gradually add a cold solution of 145 parts NaOH in 200 parts of water at 15° C. or less, with good stirring. The pH should be about 10 at this point. Extract the solution four times with 900 parts of benzene. Dry the combined benzene fractions with anhydrous sodium sulfate. Filter and remove the solvent at reduced pressure.

Yield of crude oxime—450 parts—81.8%.

Distill at 5 mm., collecting that fraction boiling between 132°–135° C.

Yield of distilled oxime—340 parts—61.8%—based on ethyl aceto acetate.

Without further elaboration, the foregoing will so fully explain our invention that others may adapt it for use under varying conditions of service.

We claim:

1. In the process of preparing the oxime of 1-diethylamino-4-pentanone in which the pentanone is prepared by acidic decarboxylation of aceto-γ-diethylamino-butyric acid, the improvement which consists in neutralizing the acidic decarboxylation reaction mixture containing the pentanone, reacting the resulting mixture with hydroxylamine, adding sufficient alkali to provide the reaction mixture with a pH of about 10, and recovering the desired oxime from the alkaline mixture.

2. In the process of preparing the oxime of 1-diethylamino-4-pentanone in which the pentanone is prepared by decarboxylation of the ethyl ester of aceto-γ-diethylamino-butyric acid in the presence of sulfuric acid, the improvement which consists in neutralizing the acidic decarboxylation reaction mixture containing the pentanone with sodium hydroxide, reacting the resulting mixture with hydroxyl ammonium sulfate, adding additional sodium hydroxide to provide the reaction mixture with a pH of 10, and then extracting the desired oxime from the alkaline reaction mixture with benzene.

MARLIN T. LEFFLER.
JAMES E. RUNDELL.

REFERENCES CITED

The following references are of record in the file of this patent:

Chamberlin, Organic Chemistry, 3d ed. 1934, pages 237–238.

Chemical Abstracts, vol. 37, column 6672 (1943).

Guha et al., Abstract from Current Science, vol. 12, pages 148–149 (1943).

Breslow et al., J. Am. Chem. Soc., vol. 66, pages 1921–1924 (1944).

Magidson, in Khim. Farm. Prom. 1935, No. 1, pages 26–34 in Chemical Abstracts, vol. 30, column 1516 (1936).